W. N. OPT.
CREAM SEPARATOR.
APPLICATION FILED APR. 1, 1921.

1,400,973. Patented Dec. 20, 1921.

Inventor
W. N. Opt.

UNITED STATES PATENT OFFICE.

WARREN N. OPT, OF TIFFIN, OHIO, ASSIGNOR TO CHARLES I. STRAUSS AND CHARLES BOND, BOTH OF TIFFIN, OHIO.

CREAM-SEPARATOR.

1,400,973.    Specification of Letters Patent.    Patented Dec. 20, 1921.

Application filed April 1, 1921. Serial No. 457,600.

*To all whom it may concern:*

Be it known that I, WARREN N. OPT, a citizen of the United States, residing at Tiffin, in the county of Seneca and State of Ohio, have invented certain new and useful Improvements in Cream-Separators; and I do hereby declare the following to be a full, clear, and exact description of the invention, such as will enable others skilled in the art to which it appertains to make and use the same.

The invention relates to means for the separation of cream from the milk after the latter has stood for some time when bottled.

The invention consists of a flexible disk, preferably of rubber, of a size to fit closely within a milk jar, a stem pivotally connected with the disk, whereby the latter may be readily inserted in the bottle through the mouth thereof, and a handle on the stem.

Other objects and advantages will be apparent and suggest themselves as the nature of the invention is understood.

While the drawings illustrate an embodiment of the invention, it is to be understood that in adapting the same to meet different conditions and requirements, various changes in the form, proportion and minor details of construction may be resorted to without departing from the nature of the invention.

Referring to the accompanying drawings forming a part of the specification,

Corresponding and like parts are referred to in the following description and designated in the several views of the drawings by like reference characters.

Figure 1:
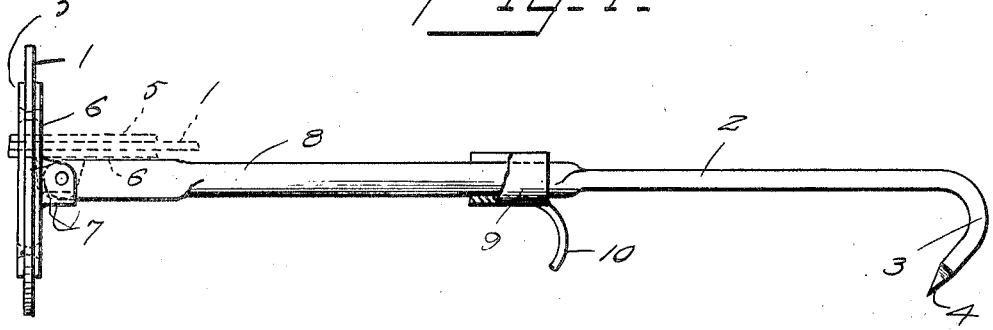
Figure 1 is a side view of the separator.
Figure 2:
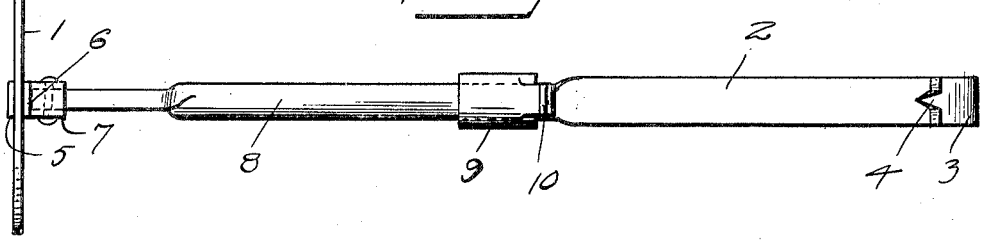
Fig. 2 is a front view thereof.
Figure 3:
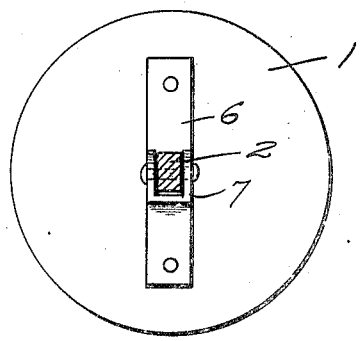
Fig. 3 is a top view of the upper bar.

The device comprises a flexible disk 1 preferably of rubber and of a size to fit snugly within the usual milk jar. A stem 2 is pivotally connected with the disk 1 and consists of a metal bar of proper length having its outer end formed into a hook 3 and terminating in a point 4, the latter serving as means for removing the usual paper disk closing the mouth of the milk bottle. The disk 1 is comprised between complemental bars 5 and 6 which are secured to each other and to the disk by suitable fastening means, such as rivets. The upper bar 6 is formed with a socket 7 which receives the lower end of the stem 2, one side of the socket being open so that the disk may fold close against the stem when introducing it into the bottle or jar through the mouth thereof. The stem 2 preferably consists of a flat bar which is given a one-quarter twist in its length to throw opposite end portions relatively at a right angle to each other. The intermediate portion is made rounding, as indicated at 8, and receives a handle consisting of a sleeve 9 and a laterally offstanding portion 10. The sleeve 9 snugly fits the rounded portion 8 of the stem so as to remain in the adjusted position. It will thus be understood that the handle may be moved to any point along the part 8 and turned to any relative angle.

It is a matter of common knowledge that milk, when bottled and permitted to stand, separates, the cream collecting on the top. The line of demarcation between the cream and milk is usually well defined. In accordance with the present invention, the cream is separated from the milk by introducing the disk 1 into the bottle or jar and disposing the same in coincident relation with the line of demarcation and since the disk 1 fits snugly within the bottle or jar, the cream thereabove may be poured off without permitting the escape of the milk which is confined by means of the disk. Preliminary to introducing the disk into the jar, it is turned to aline with the stem 2 and opposite edge portions at the sides of the bars may be bent to admit of the disk passing readily through the contracted mouth of the bottle or jar. After the disk has entered the jar, it expands or flattens out and manipulation of the stem 2 results in causing the disk to extend across the bottle or jar and separate the cream from the milk, after which the cream may be drawn off in a manner well understood.

What is claimed is:

A cream separator comprising a flexible disk, complemental bars having the disk secured therebetween, a stem having pivotal connection with one of said bars and having its outer end of hook formation and terminating in a point and having the intermediate portion made rounding, and a handle adjustable longitudinally and angularly upon the rounded portion of the stem.

In testimony whereof I affix my signature in presence of two witnesses.

WARREN N. OPT.

Witnesses:
WALTER C. RHORBACKER,
DR. C. M. SICKLES.